United States Patent
Shafi et al.

(10) Patent No.: US 11,169,796 B2
(45) Date of Patent: Nov. 9, 2021

(54) METHODS AND SYSTEMS FOR REMOTE SOFTWARE UPDATE

(71) Applicant: SIERRA WIRELESS, INC., Richmond (CA)

(72) Inventors: Nasif Bin Shafi, Richmond (CA); Xinguang Du, Vancouver (CA); Dmitry Narkevich, Port Coquitlam (CA)

(73) Assignee: SIERRA WIRELESS, INC., Richmond (CA)

( * ) Notice: Subject to any disclaimer, the term of this patent is extended or adjusted under 35 U.S.C. 154(b) by 0 days.

(21) Appl. No.: 16/529,611

(22) Filed: Aug. 1, 2019

(65) Prior Publication Data

US 2020/0042313 A1 Feb. 6, 2020

Related U.S. Application Data

(60) Provisional application No. 62/714,554, filed on Aug. 3, 2018.

(51) Int. Cl.
*G06F 8/658* (2018.01)
*H04L 9/32* (2006.01)

(52) U.S. Cl.
CPC ............ *G06F 8/658* (2018.02); *H04L 9/3239* (2013.01)

(58) Field of Classification Search
CPC .............................. G06F 8/658; H04L 9/3239
See application file for complete search history.

(56) References Cited

U.S. PATENT DOCUMENTS

| | | | |
|---|---|---|---|
| 5,832,520 A * | 11/1998 | Miller | G06F 8/658 |
| 6,526,574 B1 * | 2/2003 | Jones | G06F 8/60 |
| | | | 717/168 |
| 8,201,054 B2 | 6/2012 | Slyz et al. | |
| 8,677,021 B1 | 3/2014 | Zvenigorodsky et al. | |
| 2008/0114950 A1 | 5/2008 | Graham | |
| 2010/0205375 A1 * | 8/2010 | Challener | H04L 67/2842 |
| | | | 711/118 |
| 2011/0125993 A1 * | 5/2011 | Kim | H04N 21/4586 |
| | | | 713/2 |
| 2019/0220272 A1 * | 7/2019 | Lowe | G06F 8/658 |

FOREIGN PATENT DOCUMENTS

| | | | | |
|---|---|---|---|---|
| WO | WO-2010083682 A1 * | 7/2010 | | H03M 7/30 |
| WO | 2018054496 A1 | 3/2018 | | |
| WO | 2020024062 A1 | 2/2020 | | |

OTHER PUBLICATIONS

Naresh Kumar et al., Comparative Analysis of Deduplication Techniques for Enhancing Storage Space, IEEE, 2016, retrieved online on Jan. 15, 2021, pp. 480-487. Retrieved from the Internet: <URL: https://ieeexplore.IEEE.org/stamp/stamp.jsp?tp=&arnumber=7913243>. (Year: 2016).*
International Search Report dated Oct. 11, 2019, for International Patent Application No. PCT/CA2019/051061, 3 pages.
Written Opinion dated Oct. 11, 2019 for International Patent Application No. PCT/CA2019/051061, 4 pages.

* cited by examiner

*Primary Examiner* — Hanh Thi-Minh Bui
(74) *Attorney, Agent, or Firm* — Perkins Coie LLP

(57) ABSTRACT

The present invention provides methods and systems for efficient and effective remote software update on an embedded system by reducing the size of the target update software image.

10 Claims, 7 Drawing Sheets

ABSTRACT

METHODS AND SYSTEMS FOR REMOTE SOFTWARE UPDATE

CROSS REFERENCE TO RELATED APPLICATIONS

This application claims the benefit of priority to U.S. Patent Application Ser. No. 62/714,554 entitled "Methods and Systems for Remote Software Update" filed Aug. 3, 2018, which is hereby incorporated by reference in its entirety.

FIELD OF THE INVENTION

The present invention pertains to the field of software update and relates to systems and methods for generating updates and for performing remote software updates.

BACKGROUND

In a modern software system, software updates on embedded systems can be performed remotely by transmitting new source code to apparatuses and devices. However, embedded systems, especially those connected via cellular networks, often have restrictions on the bandwidth and payload transferred. Because of these restrictions, it is important to reduce the size of the transmitting file (e.g. target update file) when performing a remote upgrade of software (e.g. software update over the air).

One way of reducing the size of a transmitting file that has to be transferred over the air is differential patching. Performing differential patching of binary files can be performed by many programs such as bsdiff, duff, patch, imgdiff and applypatch and the like. These methods work on binary images and work well with normal data files that may differ by a small amount.

In many cases, update software is delivered as file system images. Then, the delivered file system images would be written into non-volatile memory. These file system images are normally structured, block based and can be also compressed. This means that upon rebuilding a file system image that only has a small change, for example a small change in one file within the file system image, it will still likely result in a very large change in the overall structure of the binary file that represents the file system image. When classical differential patch programs are presented with these file system images, those classical patch programs produce very large delta patches. Sometimes, the classical programs may save only as little as 5% in image size.

Therefore there is a need for methods and apparatuses for efficient remote software update that are not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of the present invention is to provide a method and system for efficient and effective remote software update by reducing the size of the target update software image. In accordance with an aspect of the present invention, there is provided a method for remote software update on an embedded system. The method includes creating, by a host system, a delta patch containing one or more differentials between a source image and a target image, wherein the creating is performed in a piece-wise manner. The creating including determining the one or more differentials between the source image and the target image, adding meta-data defining a relationship between the source image and the one or more differentials into a header of the delta path and adding the one or more differentials to the delta patch. The method further includes transmitting, by the host system, the delta patch to the embedded system.

In accordance with an aspect of the present invention, there is provided a method for remote software update on an embedded system. The method includes receiving, by a target system, a delta patch containing one or more differentials between a source image and a target image and updating, by the target system, the embedded system using the delta patch.

In accordance with another aspect of the present invention, there is provided a host system for remote software update on an embedded system. The host system including a computer processor, a memory and a network interface, wherein the memory includes machine executable instructions. The machine executable instructions, which when executed by the processor configure the host system to create in a piece-wise manner a delta patch containing one or more differentials between a source image and a target image. The creating includes determining the one or more differentials between the source image and the target image, adding meta-data defining a relationship between the source image and the one or more differentials into a header of the delta path adding the one or more differentials to the delta patch. The machine executable instructions, which when executed by the processor further configure the host system to transmit the delta patch to the embedded system.

In accordance with another aspect of the present invention, there is provided a target system for remote software update on an embedded system. The target system including a computer processor, a memory and a network interface, wherein the memory includes machine executable instructions. The machine executable instructions, which when executed by the processor configure the target system to receive a delta patch containing one or more differentials between a source image and a target image and update the embedded system using the delta patch.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

Definitions

The terms "delta" and "delta patch" refer to a set of changes on a computer software program or data that changes, updates or improves the computer software program. The delta or delta patch may be formed in a binary image file format, an executable file format or other applicable computer file format.

Unless defined otherwise, all technical and scientific terms used herein have the same meaning as commonly understood by one of ordinary skill in the art to which this invention belongs.

The present invention provides a method and system for remote software update on an embedded system. The present invention enhances ways of remotely updating software on an embedded system by reducing the size of the target update software image.

Figure 1:
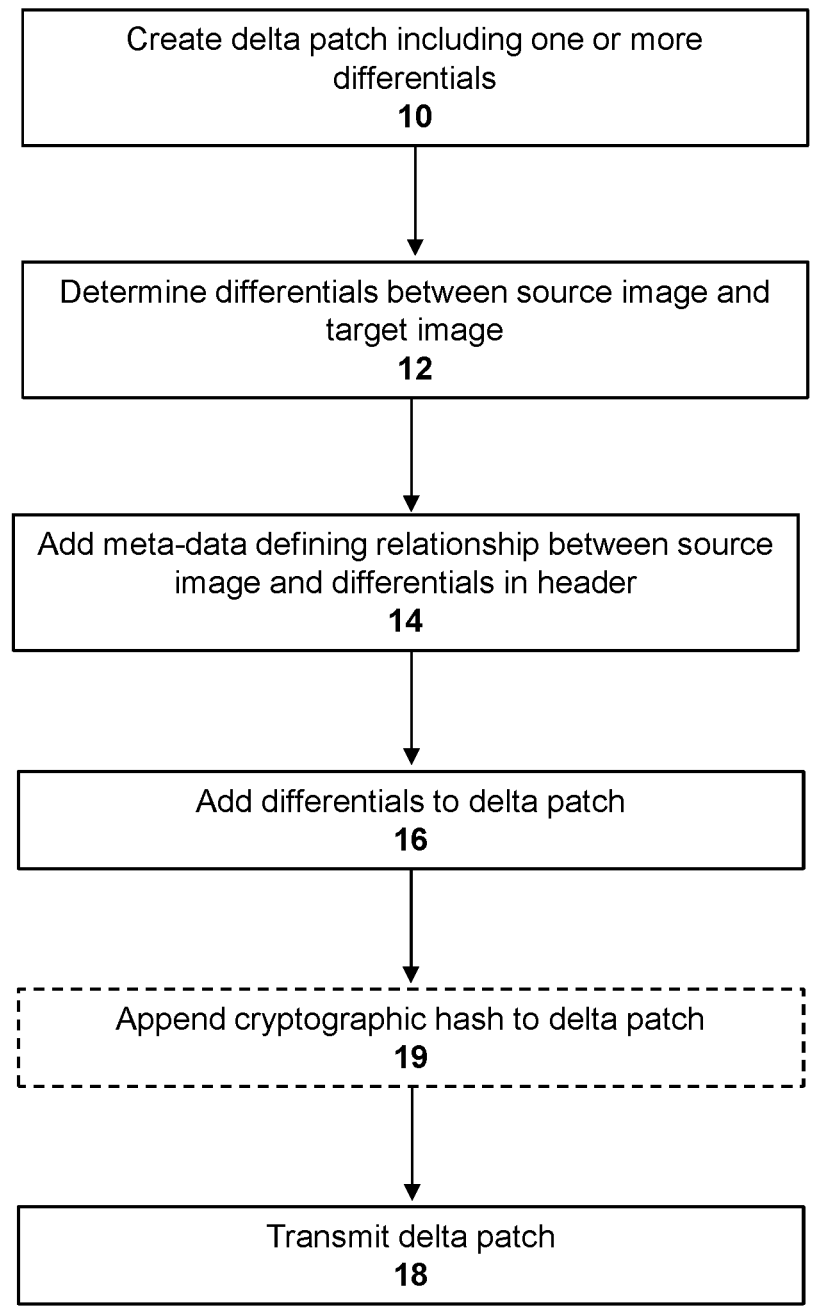
FIG. 1 is a flow diagram illustrating a method performed by a host system for remotely updating software on an embedded system in accordance with embodiments of the present invention.

FIG. 1 is a flow diagram illustrating a method performed by a host system for remotely updating software on an embedded system in accordance with embodiments of the present invention. The method includes creating 10, by a host system, a delta patch containing one or more differentials between a source image and a target image. The creating of the delta patch can be performed in a piece-wise manner. The creating includes determining 12 the one or more differentials between the source image and the target image, adding 14 meta-data defining a relationship between the source image and the one or more differentials into a header of the delta path and adding 16 the one or more differentials to the delta patch. The method further includes transmitting 18, by the host system, the delta patch to the embedded system. In some embodiments, a cryptographic hash is appended 19 to the delta patch.

Figure 2:
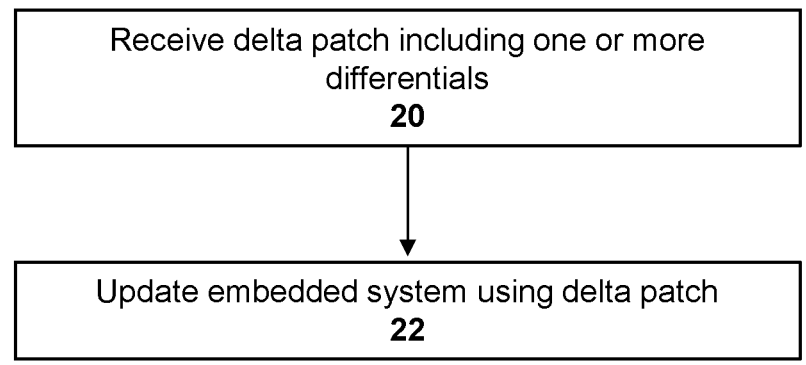
FIG. 2 is a flow diagram illustrating a method performed by a target system for updating software on an embedded system in accordance with embodiments of the present invention.

FIG. 2 is a flow diagram illustrating a method performed by a target system for method performed by a target system for updating software on an embedded system in accordance with embodiments of the present invention. The method includes receiving 20, by a target system, a delta patch containing one or more differentials between a source image and a target image and updating 22, by the target system, the embedded system using the delta patch.

Figure 3A:
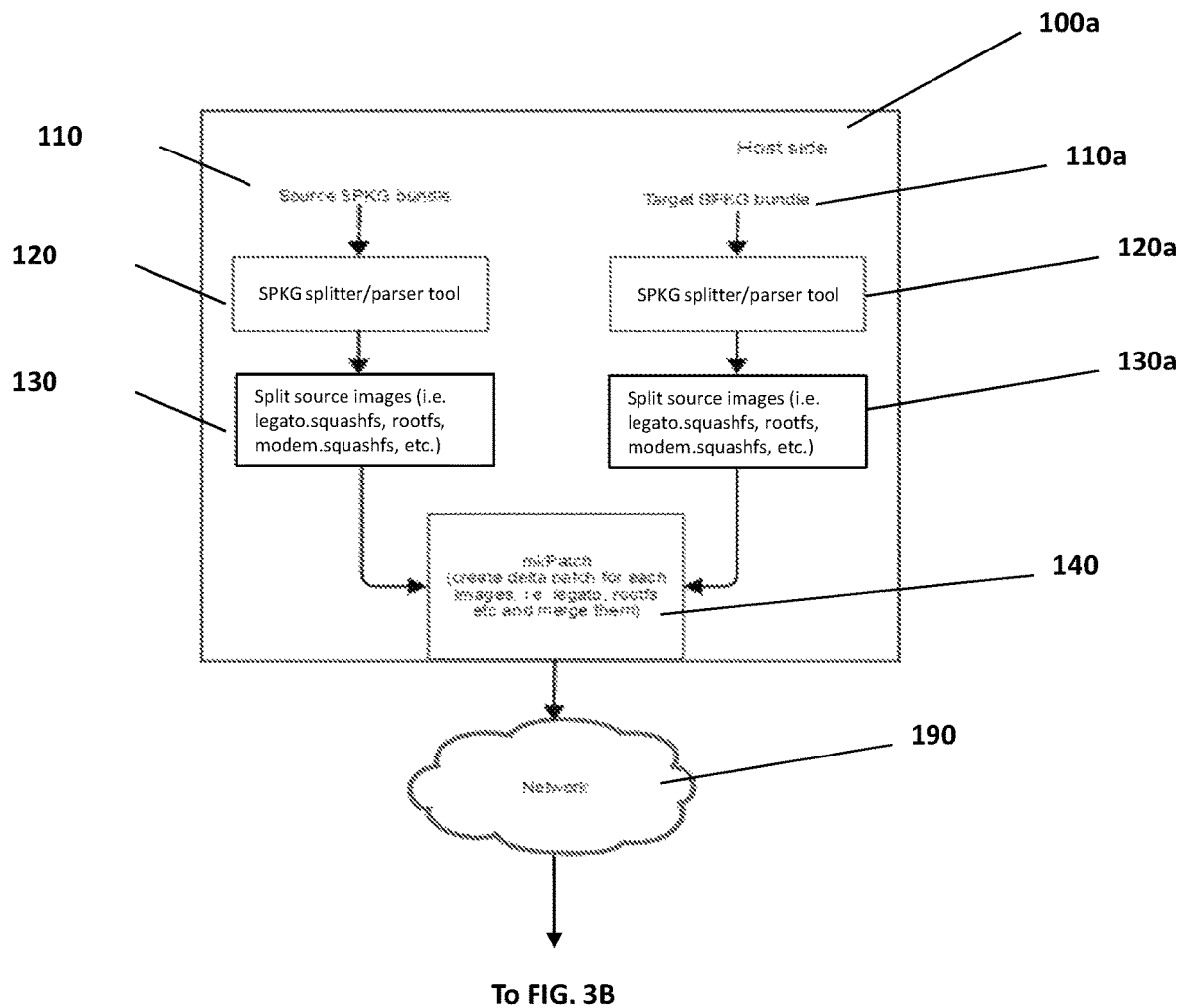
FIGS. 3A and 3B is a flow diagram, separated onto two pages, that illustrates an overall flow of remotely updating software on an embedded system in accordance with embodiments of the present invention.
Figure 3B:
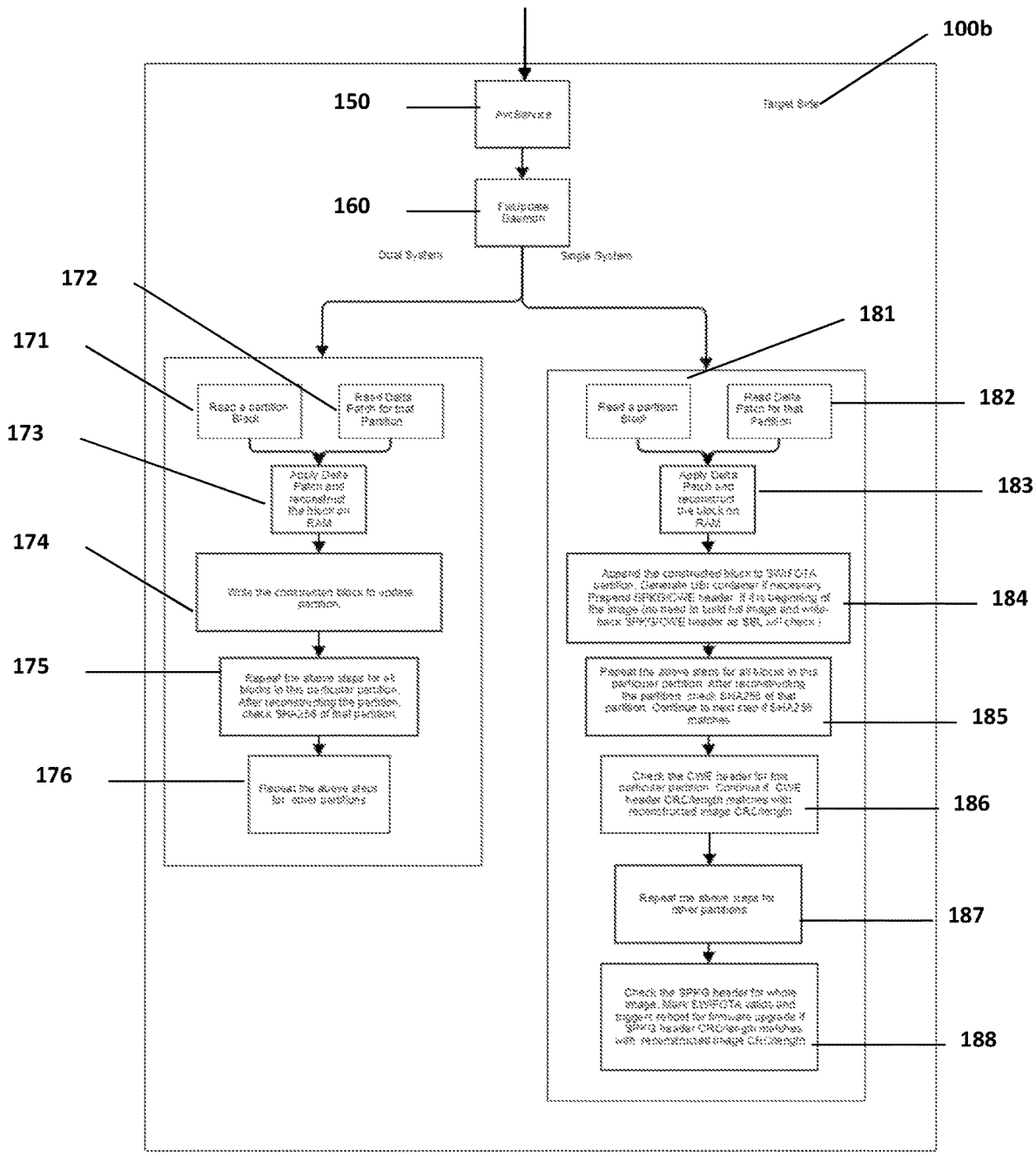

FIGS. 3A and 3B illustrate graphically a more detailed overall flow for remote software update in accordance with embodiments of the present invention. The flow or method shown in FIGS. 3A and 3B is based on a Linux™ system. It should be noted that the flow or method shown in FIGS. 3A and 3B is not necessarily limited to be implemented and/or executed on a Linux™ system. In other embodiments of the present invention, the method may be appropriately implemented and executed on other different operating systems such as Unix™ or Windows™ with comparable functions.

According to embodiments of the present invention, the overall method includes two main portions, the first portion relating to steps performed by a host system for the generation of a delta path and the second portion relates to steps performed by a target system for applying the delta patch to the embedded system.

According to embodiments, the host system may be a powerful computing system with a large amount of memory. In some embodiments, the host system may comprise one or more Linux™ based systems, such as Linux™ PC. In some embodiments, the host system may comprise one or more computing systems with other operating systems such as Unix™ or Windows™.

According to embodiments, the target system may be a computing system that is more restricted than the host system in one or more aspects. For instance, the target system may have more restrained memory unlike the host system. According to embodiments, the target system, like the host system, can be operated on various operating systems such as Linux™, Unix™ or Windows™. In some embodiments, the host system and the target system may operate using the same operating system. In some embodiments, the host system and the target system may operate using different operating systems.

According to embodiments, the delta or delta patch may be transferred to the target system over a constrained network. As the data indicative of the delta or delta patch is transferred from the host system to the target system, the data transfer may be processed in a streaming fashion. In other words, the entire delta or delta patch does not have to be transferred before the target image can be recreated.

Referring to FIGS. 3A and 3B, the host system (i.e. host side system) 100a may retrieve the system or software package (SPKG) bundle 110 of the source, e.g. source SPKG bundle, and the SPKG bundle 110a of the target, e.g. target SPKG bundle. The source SPKG bundle 110 and the target SPKG bundle 110a may be transmitted to respective SPKG splitter/parser tools 120, 120a. In some embodiments, the source SPKG bundle 110 and the target SPKG bundle 110a may be transmitted to the same SPKG splitter/parser tool. In some other embodiments, there may be a SPKG splitter/parser tool 130 that is designated for the source SPKG bundle and another SPKG splitter/parser tool 103a that is designated for the target SPKG bundle.

Once the parsing or splitting process is completed, the split/parsed source images may be generated from the source SPKG bundle 110 and the target SPKG bundle 110a. The images thereof may be legato.squashfs, rootfs, modem.squashfs, or other configuration as would be readily understood by a worker skilled in the art. Using these split source images, the host system 100a may create a delta patch for each image (e.g. legato, rootfs, etc.) and merge them. According to embodiments, the creating may be performed in a piece-wise manner. In some embodiments, the creating of the delta or delta patch may be performed by one or more functions such as the mkPatch 140, which is a Linux function, or other similar function as would be readily understood by a worker skilled in the art.

According to embodiments, once the delta patch for each image is created, the created delta patch may be transferred to the target system (i.e. target side system) 100b through network 190. According to embodiments, the data may be transmitted from the host system to the target system in a streaming fashion. In the target system 100b, the created delta patches may be obtained by the AvcService 150 and then transferred to the FwUpdate Daemon 160. In some embodiments, the AvcService 150 may be a service that communicates with the host system 100a for a software update and the FwUpdate Daemon 160 which can be a daemon (i.e. a program that may run continuously and can exists for the purpose of handing periodic service requests that a computer system expects to receive) that enable update of devices firmware.

According to embodiments, in the case of a dual system, the target system 100b may read 171 a partition block. The target system 100b may also read 172 a delta patch for that partition. When a partition block and the delta patch for that partition are read, the target system 100b may apply 173 the delta patch and reconstruct the block on random access memory (RAM). Then, the target system 100b may write 174 the constructed block to update the partition. When all tasks are completed, the target system 100b may repeat 175 the above steps (steps 171 to 174) for all blocks in this particular partition. After reconstructing the partition, the target system 100b may check a cryptographic hash (e.g. SHA-256 or other suitable hash as would be readily understood by a worker skilled in the art) of that partition. When all steps for the partition (i.e. the partition block read in step 171) is done, the target system 100b may repeat 176 the above steps (i.e. steps 171 to 175) for other partitions.

According to embodiments, in the case of a single system, the target system 100b may read 181 a partition block. The target system 100b may also read 182 a delta patch for that partition. When a partition block and the delta patch for that partition are read, the target system 100b may apply 183 the delta patch and reconstruct the block on random access memory (RAM). Then, the target system 100b may append 184 the constructed block to SWIFOTA partition. The target system 100b may also generate an unsorted block image (UBI) container if necessary. If it is the beginning of the image, the target system 100b may prepend SPKG/CWE header (CWE—common weakness enumeration). According to embodiments, there is no need to build a full image and write-back header as a serial bootloader (SBL) will check. When all tasks are completed, the target system 100b may repeat 185 the above steps (steps 181 to 184) for all blocks in this particular partition. After reconstructing the partition, the target system 100b may check cryptographic hash (e.g. SHA-256 or other hash configuration as would be readily understood) of that partition. If the check cryptographic hash matches, the target system 100b may continue to next step. According to embodiments, the next step can include the target system 100b checking 186 the CWE header for this particular partition. If the CWE header cyclic redundancy check (CRC)/length matches with the reconstructed image CRC/length, the target system 100b may continue to the next step.

When all steps for the partition (i.e. the partition block read in step 181) are completed, the target system 100b may repeat 187 the above steps (i.e. steps 181 to 186) for other partitions.

When the above steps for other partitions are completed, the target system 100b may check 188 the SPKG header for the whole image. If the SPKG header CRC/length matches with the reconstructed image CRC/length, the target system 100b may mark SWIFOTA valid and trigger a reboot for firmware upgrade.

Figure 4:
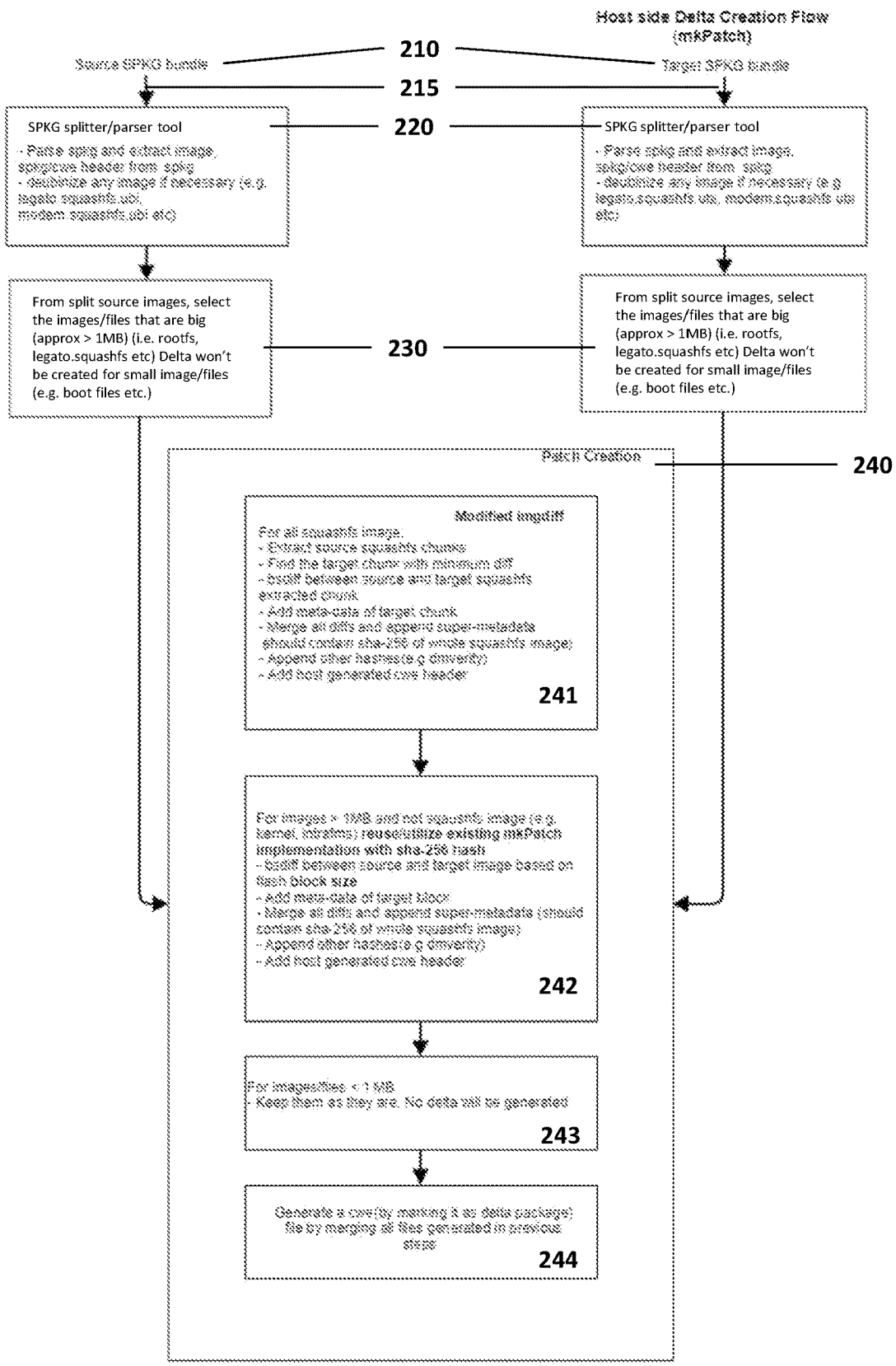
FIG. 4 is a flow diagram illustrating a method performed by a host system for creating a delta patch in accordance with embodiments of the present invention.

FIG. 4 illustrates a method performed by a host system (i.e. host side system) for creating a delta patch in accordance with embodiments of the present invention. The host system shown in FIG. 4 is based on a Linux™ system. It should be noted that the host system shown in FIG. 4 is not necessarily limited to be implemented and/or executed on a Linux™ system. In other embodiments of the present invention, the host system may implement and execute using other operating systems such as Unix™ or Windows™ with comparable functions.

According to embodiments, the delta patch creation at the host system may take a source filesystem image and a target filesystem image. The source file may be the image file that should already exist on the target system (i.e. the target side system) and would be updated through a software update process. In the end, the updated source image file should match with the target image.

According to some embodiments, squashfs may be used in this process. Squashfs utilizes compression, and stores information in individual chunks. To create the delta or delta patch, the structure of squashfs may be decomposed and each individual chunk from the source file system and target file system may be compared. Then, the matching of source chunks to target chunks that results in the minimal delta size may be selected. Once the source chunk and the target chunk that would result in the minimal delta size are selected, metadata describing the relationship between the source file system and delta may be written into a header, and then the delta data itself may be added into the delta patch. This process is repeated until all chunks have been processed. According to embodiments, the output is the delta patch image that will be streamed to the target system.

Referring to FIG. 4, the host system (i.e. host side system) may retrieve 210 the source SPKG bundle and the target SPKG bundle. The source SPKG bundle and the target SPKG bundle may be transmitted 215 to the SPKG splitter/parser tool. In some embodiments, the source SPKG bundle and the target SPKG bundle may be transmitted to the same SPKG splitter/parser tool. In some other embodiments, there may be a SPKG splitter/parser tool that is designated for the source SPKG bundle and another SPKG splitter/parser tool that is designated for the target SPKG bundle.

Once the source SPKG bundle and the target SPKG bundle are transmitted 215 to the SPKG splitter/parser tool, the SPKG splitter/parser tool may parse 220 SPKG and then extract the image and SPKG/CWE header from SPKG. If necessary, the SPKG splitter/parser tool may deubinize any image, for example legato.squashfs.ubi image or modem.squashfs.ubi image.

According to embodiments, when the parsing or splitting process is completed, the split/parsed images may be generated from each of the source SPKG bundle and the target SPKG bundle. From the split source images, the host system may select 230 images or files that are sufficiently big (e.g. approximately bigger than 1 MB). The images may be legato.squashfs, rootfs, etc. According to embodiments, the delta patch may not be created for small images or files such as boot files, etc.

Then, the host system may create 240 a delta patch for each image. According to embodiments, the creation of the delta patch may be performed in a piece-wise manner as illustrated below.

According to embodiments, if 241 the selected image is a squashfs image, the host system may extract source squashfs chunks then find the target chunk with minimal differences with the source squashfs chunks. The host system then may perform a function such as bsdiff to generate a patch (i.e. a set of changes) between the source squashfs and the target squashfs extracted chunk. The host system may add meta-data of the target image chunk and add the differential between a source file image chunk and the selected target file image chunk into the delta patch. According to embodiments, the host system may repeat the above steps until all image chunks have been processed. Once the process is completed, the host system may merge all differentials into the delta patch and append super-metadata to the header of the delta patch. According to embodiments, the patch may contain a cryptographic hash (e.g. SHA-256 or other hash configuration as would be readily understood) of whole squashfs image. In some embodiments, the host system may append other hashes, such as dm-verity, if necessary. The host system may add host-generated CWE header (e.g. CWE header generated by the host system) into the delta patch.

According to embodiments, if 242 the selected image is not a squashfs image (e.g. kernel, intrafms) and the image is bigger than 1 megabyte, the host system may reuse/utilize existing mkPatch implementation with SHA-256 hash. The host system may perform a function such as bsdiff to generate a patch (i.e. a set of changes) between the source and target image based on flash block size. The host system may add meta-data of the target block. According to embodiments, the host system may repeat the above steps until all flash blocks have been processed. Once the process is completed, the host system may merge all differentials into the delta patch and append super-metadata to the header of the delta patch. According to embodiments, the patch may contain a cryptographic hash (e.g. SHA-256 or other has configuration as would be readily understood) of the whole image. In some embodiments, the host system may append other hashes, such as dm-verity, if necessary. The host system may add a host-generated CWE header (e.g. CWE header generated by the host system) into the delta patch.

According to embodiments, if 243 the selected image, the selected image at step 230, is not squashfs image and the images are smaller than 1 megabyte; the host system may just keep the images as they are. In this case, no delta will be generated.

According to embodiments, once 244 all steps illustrated above are finished, the host system may generate a CWE (by marking it as delta package) file by merging all files generated in previous steps.

Below is an example format of delta patch metadata in accordance with embodiments of the present invention. The format below may be used for metadata and/or super-metadata mentioned herein.

```
Format of meta-data for squashfs diffs
{
    "IMGDIFF1"              (8)         [magic number and version]
    Source Imglen           (4)
    Source Img SHA256       (64)
    Target Imglen           (4)
    Target Img SHA256       (64)
    chunk count             (4)
    for each chunk:
        chunk type          (1)         [CHUNK_{NORMAL,
                                         DEFLATE, RAW}]
        if chunk type == CHUNK_NORMAL:
            source start    (4)
            source len      (4)
            Patch len       (4)
            Patch Data      (Patch len)
        if chunk type == CHUNK_DEFLATE:
            source start    (4)
            source len      (4)
            source expanded len  (4)    [size of uncompressed source]
            target expected len  (4)    [size of uncompressed target]
            gzip level      (2)
            method          (2)
                windowBits  (2)
                memLevel    (2)
                strategy    (2)
            Patch len       (4)
            Patch Data      (Patch len)
        if chunk type == RAW:           [addition of new data]
            patch len       (4)
            patch data      (patch len)
}
```

Figure 5:
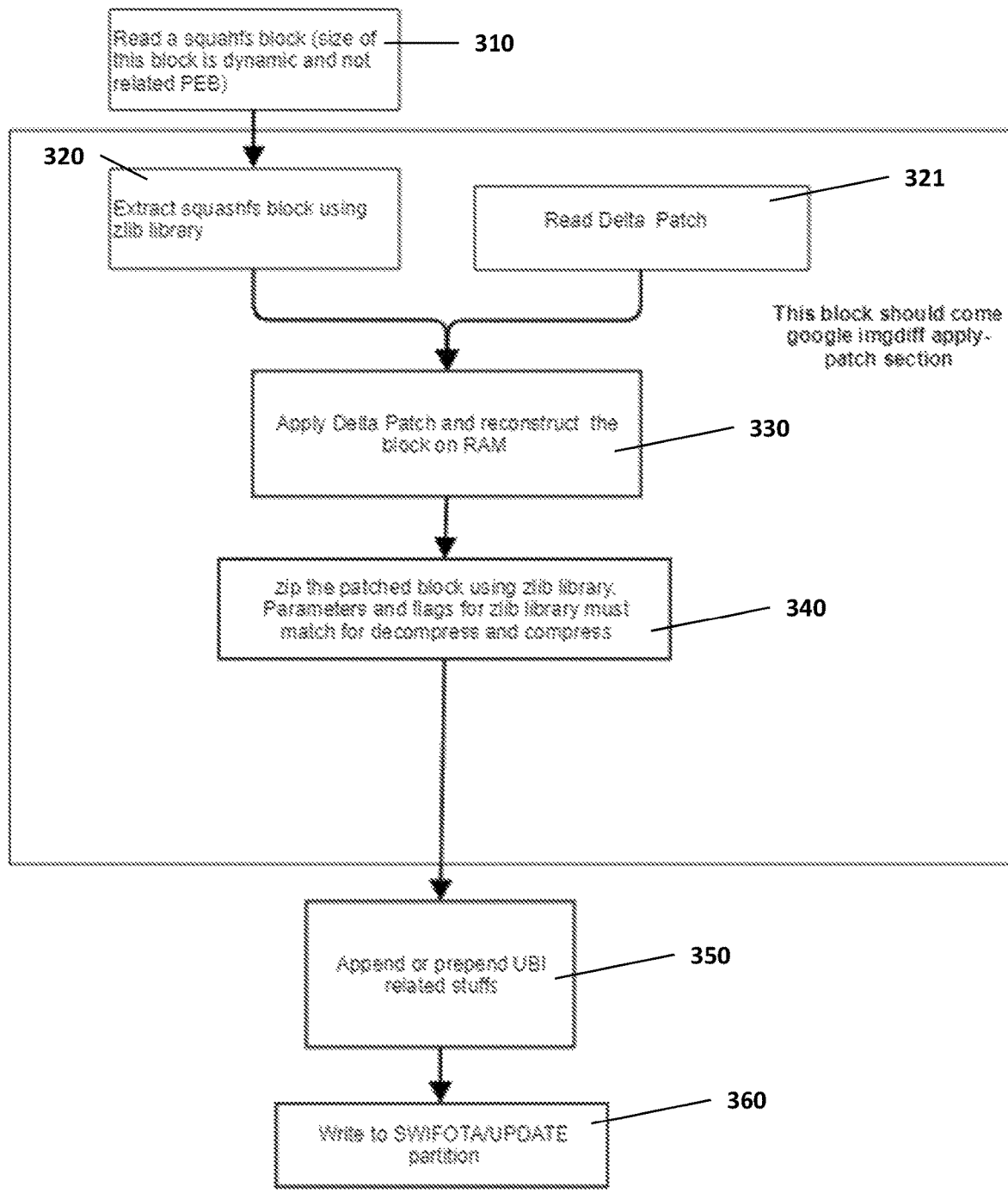
FIG. 5 is a flow diagram illustrating a software update method performed by a target system in accordance with embodiments of the present invention.

FIG. 5 illustrates a software update process by a target system (i.e. target side system) in accordance with embodiments of the present invention. The process shown in FIG. 5 illustrates a delta update of a squashfs block. It should be noted that the process shown in FIG. 5 is not necessarily limited to a delta update of a squashfs block but just an example of a software update process on a target system side.

According to embodiments, the delta patch may be streamed to the target system. The incoming metadata describing the source chunks and target chunks may be read and then used to read the original source filesystem and apply the patch. Then, the result may be written into the update non-volatile memory (e.g. update partition of non-volatile memory).

According to embodiments, entire data may not need to be transmitted at once. If the streamed data is interrupted, the streaming can be resumed from the last previously written chunk of the data saved in the update area/partition (e.g. update partition of non-volatile memory).

Referring to FIG. 5, once the delta patch is streamed to the target system, the target system (i.e. target side system) may read 310 a squashfs block. The size of this squashfs block may be dynamic and not related to physical erase blocks (PEB). Then, the target system may extract 320 squashfs block using a data compression library such as zlib library, or other library used for data compression as would be readily understood. The target system may also read 321 a delta patch for that squashfs block. When a squashfs block is extracted and the delta patch for that partition is read, the target system may apply 330 the delta patch to the target system and reconstruct the block on random access memory (RAM). Then, the target system may compress (e.g. zip or other data compression technique) 340 the patched block using the data compression library (e.g. zlib library). Parameters and flags for the data compression library should match for decompress and compress.

Once the above steps are completed, the target system may append 350 or prepend unsorted block images (UBI) related elements into the system. Then, the target system may write 360 the constructed block to SWIFOTA/UPDATE partition.

Figure 6:
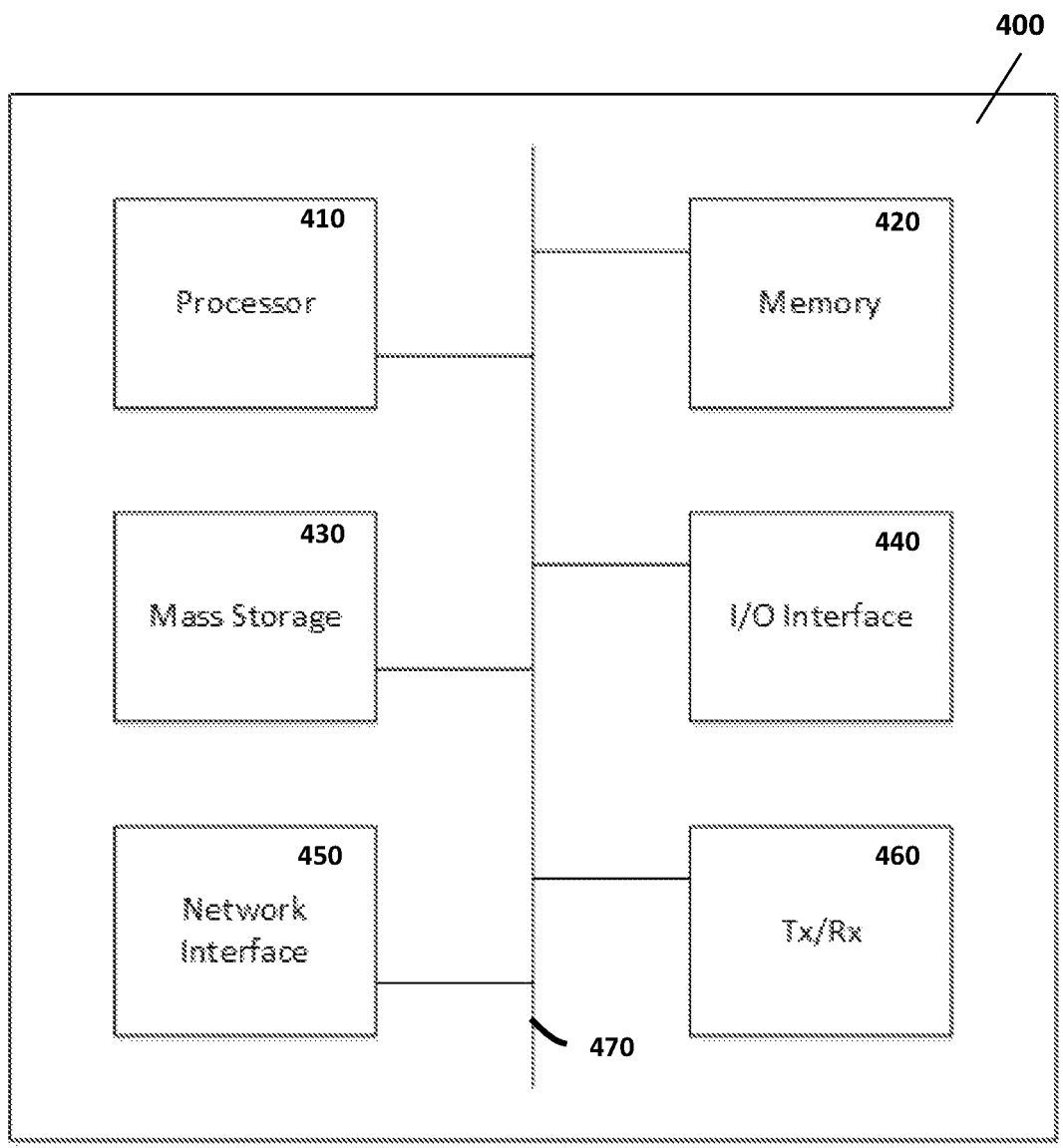
FIG. 6 is a schematic diagram of a hardware device in accordance with embodiments of the present invention.

FIG. 6 is a schematic diagram of an electronic device 400 that may perform any or all of steps of the above methods and features described herein, according to different embodiments of the present invention. For example one or more of a host system and a target system can be configured as an electronic device.

As shown, the device includes a processor 410, memory 420, non-transitory mass storage 430, I/O interface 440, network interface 450, and a transceiver 460, all of which are communicatively coupled via bi-directional bus 470. According to certain embodiments, any or all of the depicted elements may be utilized, or only a subset of the elements. Further, the device 400 may contain multiple instances of certain elements, such as multiple processors, memories, or transceivers. Also, elements of the hardware device may be directly coupled to other elements without the bi-directional bus.

The memory 420 may include any type of non-transitory memory such as static random access memory (SRAM), dynamic random access memory (DRAM), synchronous DRAM (SDRAM), read-only memory (ROM), any combination of such, or the like. The mass storage element 430 may include any type of non-transitory storage device, such as a solid state drive, hard disk drive, a magnetic disk drive, an optical disk drive, USB drive, or any computer program product configured to store data and machine executable program code. According to certain embodiments, the memory 420 or mass storage 430 may have recorded thereon statements and instructions executable by the processor 410 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for remote software update on an embedded system, the method comprising:
    creating, by a host system, a delta patch containing one or more differentials between a source image and a target image, wherein the creating is performed in a piece-wise manner, the creating including:
        splitting the source image into a plurality of source image chunks and splitting the target image into a plurality of target image chunks;
        decomposing the plurality of source image chunks and the plurality of target image chunks for comparison of each source image chunk and target image chunk;
        determining the one or more differentials between the source image and the target image, each differential determined upon selecting one of the decomposed target image chunks such that the selected target image chunk has minimal difference with a respective one of the decomposed source image chunks;
        adding meta-data defining a relationship between the source image and the one or more differentials into a header of the delta patch;
        adding the one or more differentials to the delta patch; adding super meta-data to the header of the delta patch; and
        transmitting, by the host system, the delta patch to a target system;
    wherein the delta patch is created only if the source image and the target image are squashfs images or size of each file is greater than 1 megabyte.

2. The method according to claim 1, wherein the creating the delta patch further comprises appending one or more cryptographic hashes into the delta patch.

3. The method according to claim 1, wherein the creating the delta patch further comprises adding a header generated by the host system into the delta patch.

4. The method according to claim 1, wherein the source image and the target image are squashfs images.

5. A method for remote software update on an embedded system, the method comprising:
    receiving, by a target system from a host system, a delta patch containing:
        one or more differentials between a source image and a target image, each differential determined upon selecting a target image chunk of the target image, the selected target image chunk having minimal difference with a respective source image chunk of the source image, wherein the source image chunk and the target image chunk are decomposed for comparison of the source image chunk and the target image chunk, before the selection; and
        a header including meta-data defining a relationship between the source image and the one or more differentials; and
    updating, by the target system, the embedded system using the delta patch;
    wherein the sending and receiving of the delta patch are processed in a streaming fashion thereby enabling recreation of the target image to be started without requiring the delta patch in entirety.

6. A host system for remote software update on an embedded system comprising:

a computer processor, a memory and a network interface, the memory including machine executable instructions which when executed by the processor cause the host system to be configured to:
   create in a piece-wise manner a delta patch containing one or more differentials between a source image and a target image, wherein to create the delta patch the host system is configured to:
      split the source image into a plurality of source image chunks and split the target image into a plurality of target image chunks;
      decompose the plurality of source image chunks and the plurality of target image chunks for comparison of each source image chunk and target image chunk;
      determine the one or more differentials between the source image and the target image, each differential determined upon selecting one of the decomposed target image chunks, the selected target image chunk having minimal difference with a respective one of the decomposed source image chunks;
      add meta-data defining a relationship between the source image and the one or more differentials into a header of the delta path;
      add the one or more differentials to the delta patch;
      add super meta-data to the header of the delta patch; and
   transmit the delta patch to a target system;
   wherein the delta patch is created only if the source image and the target image are squashfs images or size of each file is greater than 1 megabyte.

7. The host system according to claim 6, wherein the machine executable instructions which when executed by the processor cause the host system to be further configured to append one or more cryptographic hashes into the delta patch when creating the delta patch.

8. The host system according to claim 6, wherein the machine executable instructions which when executed by the processor cause the host system to be further configured to add a header generated by the host system into the delta patch when creating the delta patch.

9. The host system according to claim 6, wherein the source image and the target image are squashfs images.

10. A target system for remote software update on an embedded system comprising:
   a computer processor, a memory and a network interface, the memory including machine executable instructions which when executed by the processor cause the target system to be configured to:
      receive from a host system a delta patch containing:
         one or more differentials between a source image and a target image, each differential determined upon selecting a target image chunk of the target image, the selected target image chunk having minimal difference with a respective source image chunk of the source image, wherein the source image chunk and the target image chunk are decomposed, for comparison of the source image chunk and the target image chunk, before the selection; and
      a header including meta-data defining a relationship between the source image and the one or more differentials; and
   update the embedded system using the delta patch;
   wherein the sending and receiving of the delta patch are processed in a streaming fashion thereby enabling recreation of the target image to be started without requiring the delta patch in entirety.

* * * * *